Figure 1:
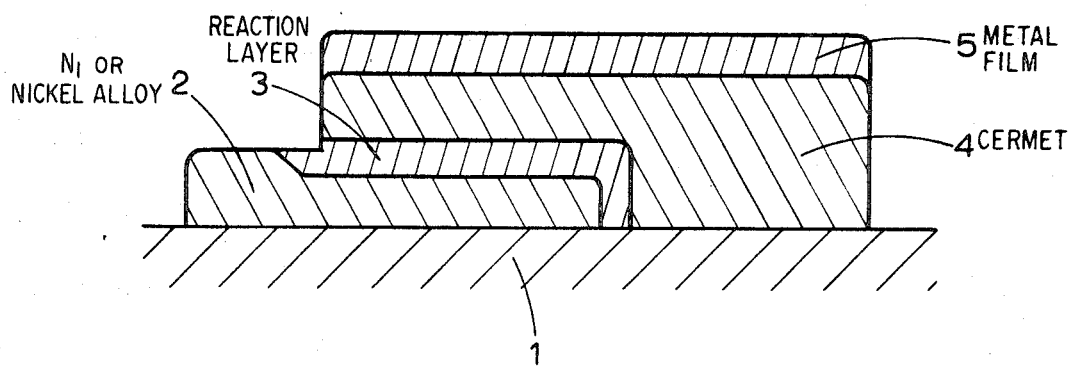

United States Patent [19]

Edge

[11] 3,721,870
[45] March 20, 1973

[54] CAPACITOR
[75] Inventor: James Edge, Morpeth, England
[73] Assignee: Welwyn Electric Limited, Bedlington, Northumberland, England
[22] Filed: June 25, 1971
[21] Appl. No.: 156,700

Related U.S. Application Data

[63] Continuation-in-part of Ser. No. 47,767, June 19, 1970, abandoned.

[52] U.S. Cl. ............... 317/258, 29/25.42, 117/217, 117/227, 117/70 C
[51] Int. Cl. ............................................. H01g 1/01
[58] Field of Search ...... 317/258; 117/227, 217, 230, 117/70 C; 75/170; 29/25.42

[56] References Cited

UNITED STATES PATENTS

| 3,254,970 | 6/1966 | Dittrich | 75/170 X |
| 3,353,124 | 11/1967 | Dilger | 317/258 X |
| 3,386,856 | 6/1968 | Noorlander | 117/230 X |
| 3,469,973 | 9/1969 | Underwood | 75/170 X |
| 3,523,224 | 8/1970 | Gamari | 317/258 |
| 3,548,266 | 12/1970 | Frantz | 317/258 X |

Primary Examiner—E. A. Goldberb
Attorney—McDougall, Hersh & Scott

[57] ABSTRACT

The manufacture is described of capacitors having a very high capacitance value which is achieved by a very thin dielectric layer, said capacitors being constituted by (i) a layer of nickel or a nickel alloy, (ii) a layer of a cermet adapted to become electrically conductive and containing glass having a melting point less than that of layer (i), and (iii) a layer of a dielectric, said layer (iii) having been formed by chemical interaction of layer (i) with layer (ii) on firing to a temperature at which said interaction takes place, for a time sufficient to produce said layer (iii), the glass content of the cermet being at least 3 percent by weight but insufficient for the cermet itself to act as a dielectric.

9 Claims, 5 Drawing Figures

CAPACITOR

The present invention is a continuation-in-part of application Ser. No. 47,767, filed on June 19, 1970 now abandoned and relates to a novel dielectric, an electrical capacitor having a layer of the dielectric and to methods of making the dielectric and the capacitor.

Resistive cermets are known which, after heating to a high temperature, become electrically conducting. Such known cermets are described, for example, in the 1968 Hybrid Microelectronics Symposium, pages 173-181, by Darwyn L. Herbst (International Society for Hybrid Microelectronics, October 28-30, 1968, O'-Hare Inn, Rosemont, Illinois,); they are resistor pastes which are mixtures of glass frits, metal(s) and/or metal compounds, usually metal oxides, in a suitable carrier system.

It is known to produce capacitors by firing an oxygen-permeable paint composed of a frit containing noble metal particles on to a nickel sheet in such a way that a nickel oxide layer is formed between the paint and the nickel sheet. This known process depends on the use of a conducting paint which is permeable to oxygen and therefore does not contain any glass, whereby oxidation of the nickel sheet can occur. According to this known process, it is also necessary to attach a second contact to the nickel without the formation of a dielectric layer by the application of a conductive glaze which is "not permeable to oxygen". The required degree of impermeability is achieved by the incorporation of about 2 percent of glass (e.g. borosilicate glass) into a conductive silver composition, so that, on melting, the glass forms a continuous coating by sealing the silver particles together.

I have found that if conductive glazes with a glass content of 3 percent or more (preferably at least 10 percent) are used, it is not possible to obtain a good direct contact to nickel, although good contacts can be made to other metals, e.g. gold. Further investigation of this unexpected phenomenon has led to the finding that a new dielectric can be formed as will be described in more detail hereinafter.

It is an object of the present invention to provide a novel dielectric by means of which a very large capacitance value can be obtained.

It is a further object of the present invention to provide a capacitor having a very thin dielectric layer whereby the capacitor is endowed with a large capacitance value.

It is an additional object of the present invention to provide a process for making capacitors having a very thin dielectric layer.

Further objects of the present invention will become apparent hereinafter.

The present invention provides a capacitor constituted by (i) a layer of nickel or a nickel alloy, (ii) a layer of a cermet capable of becoming electrically conductive on firing and containing glass having a melting point less than that of layer (i) (said cermet is well-known in the art), and (iii) a layer of a dielectric, said layer (iii) having been formed by chemical interaction of layer (i) with layer (ii) on firing to a temperature at which said interaction takes place and for a time sufficient to produce said layer (iii), the glass content of the cermet being at least 3 percent by weight but insufficient for the specific resistivity of the cermet itself to exceed $10^6$ ohm centimeter. The appropriate firing temperature and time for any given layers (i) and (ii) may be easily determined by experiment.

The present invention also provides a dielectric layer formed by the chemical interaction on firing of said layers (i) and (ii).

The present invention further provides a process for making a capacitor, which comprises applying a layer of the above cermet to a layer of nickel or nickel alloy, and firing the resulting composite article so as to form a third, dielectric layer between said first two layers by chemical interaction thereof, whereby a capacitor is formed.

The present invention additionally provides a process for making the dielectric of the invention which comprises causing chemical reaction to take place by firing the above layers (i) and (ii), whereby the dielectric is formed.

In the capacitor of the present invention the firing causes the cermet to become electrically conductive and causes an insulating film to be formed at the interface between the cermet layer and nickel or nickel alloy (e.g. nickel with boron, nickel with phosphorus or nickel with phosphorus and cobalt) layer; however, the insulating layer produced in this way is very thin and hence a large capacitance value is obtained because the said insulating layer is essentially defined by the region of interaction between the nickel or nickel alloy layer, which is electrically conductive, and the glass in the cermet.

It is thus seen that, in carrying out the process of the present invention, the above mentioned dielectric layer is formed at the interface of two conductive layers (i.e. the nickel or nickel alloy layer on the one hand and the cermet layer on the other hand) by means of a chemical reaction; the cermet may be applied over the nickel or a nickel alloy layer, for example, by means of well-known screen printing techniques.

It is known that a thin insulating layer can be produced in a system consisting of a coating of an oxygen permeable silver paint applied to the surface of a sheet of nickel which is then placed in a furnace at about 900°C. Oxygen from the atmosphere permeates the silver layer and the surface of the nickel sheet in contact with the silver layer is oxidized, thereby forming a thin dielectric film of nickel oxide. With such a technique, it is important to ensure that the high temperature oxidation treatment is carried out in the presence of an adequate supply of oxygen (e.g. air) and that the layer of silver paint is uniformly permeable to oxygen. The properties of the capacitor so formed are those of the oxide of the metal constituting the metal sheet to which the oxygen permeable conductive layer is applied.

Although the exact constitution of the dielectric layer of the capacitor of the present invention is not known, test have shown that, unlike that of the capacitor mentioned in the preceding paragraph, it is not a simple metal oxide formed by a reaction of a metal layer with oxygen from the atmosphere. Thus my dielectric layer does not have the undesirable semiconducting properties of nickel oxide and does not depend on the porosity of an electrode to oxygen for its formation, nor does it have the considerable thickness which is associated with known glass like dielectrics when these are applied by relatively simple manufacturing techniques. My findings are confirmed by the following evidence.

1. The dielectric of this invention can be produced in an inert atmosphere. For example, using a composition containing a semiconductive oxide powder produced by burning an alloy of tin and antimony (a suitable such alloy is described in U.K. Pat. No. 1,031,651 issued to Welwyn Electric Limited, published June 2, 1966) dispersed with an equal weight of material sold under the designation L92 glass by Glass Tubes and Components Limited, Sheffield Road, Chesterfield, England. This composition gave capacitors with similar properties when fired in air and in nitrogen at 800°C. In both cases the yield and quality were poor.

2. The loss factors of the capacitors produced by my process are better than those obtained for nickel oxide capacitors. Furthermore, if the nickel is oxidized before the cermet is fired on to it, electrical properties of the resulting capacitors are poorer than those of capacitors of my invention. For this reason, accidental formation of an oxide layer on the nickel of my capacitors is considered disadvantageous.

3. Numerous attempts to establish the structure and composition of the capacitor dielectric have only partly clarified the problem. As pointed out hereinafter, the nickel or nickel alloy film interacts with the cermet during the formation of the dielectric layer to a depth of up to about 3000 A, but the glass from the cermet is the main ingredient of the dielectric layer. The best indication of the composition of the dielectric layer is obtained by examination of a fractured section through a capacitor using an electron probe analyzer. This shows that, if a layer (ii) of a silver-containing cermet and a layer (i) of nickel are used, the silver and nickel films are divided by a glassy phase. Thus, during firing, the silver and glass in the cermet seem to separate into layers, possibly due to interaction of the glass with the nickel alloy, leaving a glass as the dielectric.

From the above evidence, I conclude that when nickel interacts with the glass in the cermet, it appears to produce a layer (i.e. the dielectric) into which the conductive phase cannot migrate. This phenomenon suggests that, in addition to the chemical reaction, there also takes place the exclusion of the conducting phase due to physical restraint or electrostatic forces.

The dielectric layer is formed by chemical interaction between the glass in the cermet and the underlying metallic layer (i.e. the nickel or nickel alloy). For this reason, a (i.e. minimum content of glass is necessary in the cermet and in practice, conductive cermets having at least 3 percent, preferably 10 percent or more, by weight of glass should be used. On the other hand, this glass content should not be so high that the cermet itself acts as a dielectric. The maximum level of the glass content in the cermet depends on the nature of the electrically conductive phase in the cermet which is used, but it should be such that the specific resistivity of the cermet does not exceed $10^6$ ohm centimeter. With a typical cermet thickness of 0.002 centimeter, this upper limit of specific resistivity is obtained when a cermet having a sheet resistivity of $5 \times 10^8$ ohm per square is used. The preferred range of sheet resistivity for the cermet is from 0.01 ohm per square to $10^6$ ohm per square.

As indicated above, the glass in the cermets which may be used in the present invention is well known; this glass includes, for example, lead-borate, lead-borosilicate, borosilicate and lead-borobismuthate systems, etc.

Typical cermets which have been found to be satisfactory for the formation of dielectric layers by interaction with nickel or a nickel alloy are:

a. Du Pont 7800 Series, supplied by E.I. Du Pont de Nemours & Co., of Wilmington, Delaware, U.S.A. having a recommended peak firing temperature of 760°C.

b. R-13, R-14, R-15 and R-16 paste manufactured by Alloys Unlimited Inc., and marketed by Kemtron International Ltd., Metropolitan House, Victoria Avenue, Southend-on-Sea, Essex, England, and recommended for firing at 775°C.

c. Gold conducting composition C5004, manufactured by Alloys Unlimited Incorporated and having a recommended firing temperature of 700°C.

d. A composition comprising 40 percent by weight of Du Pont 7713 silver paste and 60 percent by weight of powdered X76 glass (the glass being made by Glass Tubes and Components Limited, Sheffield Road, Chesterfield, England) which is suitably fired at 700°C.

Dielectric layers with good electrical properties have been formed by reaction of the above four specific cermets with layers of nickel or nickel alloy (e.g. a nickel-phosphorus alloy, nickel-boron alloy or a nickel-phosphorus-cobalt alloy). When a high temperature firing process is necessary for the cermet, nickel and nickel-phosphorus alloy suffer from the disadvantage that any uncoated portions oxidize severely unless an inert atmosphere is used in the furnace. An alloy of nickel-boron, on the other hand, does not oxidize as rapidly and temperatures up to the melting point of a nickel-boron alloy may be used for firing cermets thereon. Dielectric films formed by the interaction of nickel-boron alloy with a conductive cermet have also shown the best capacitor properties. The nickel-boron alloy film should be of sufficient thickness to give an adequate base electrode even after it has been partly chemically reacted with the cermet. The thickness of the nickel or nickel alloy film which interacts with the cermet during the formation of the dielectric film, depending on the duration and temperature of the firing, can be as great as 3,000 angstrom units; for this reason, in order to ensure that a metallic electrode layer remains, a capacitor will be formed if the nickel or nickel alloy layer to which the cermet is applied is greater than 3,000 angstrom units in thickness. In practice, however, electrode layers of low resistivity are required and nickel or nickel alloy layers of about 80,000 angstrom units are generally used.

Figure 2:
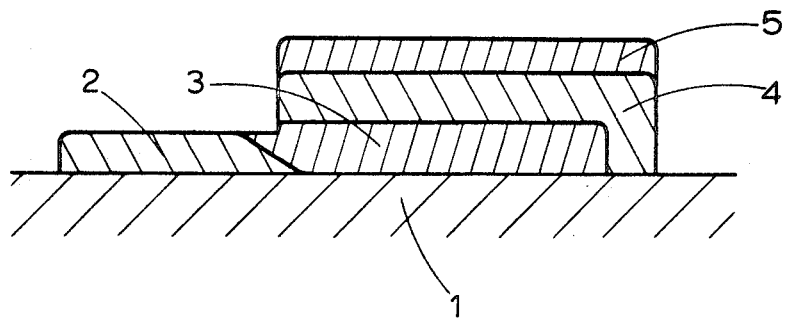
Figure 3:
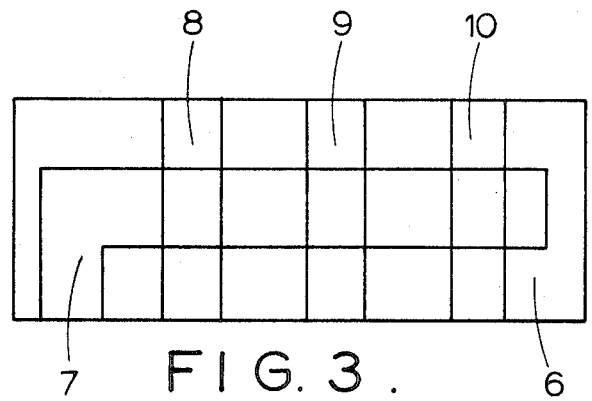
Figure 4:
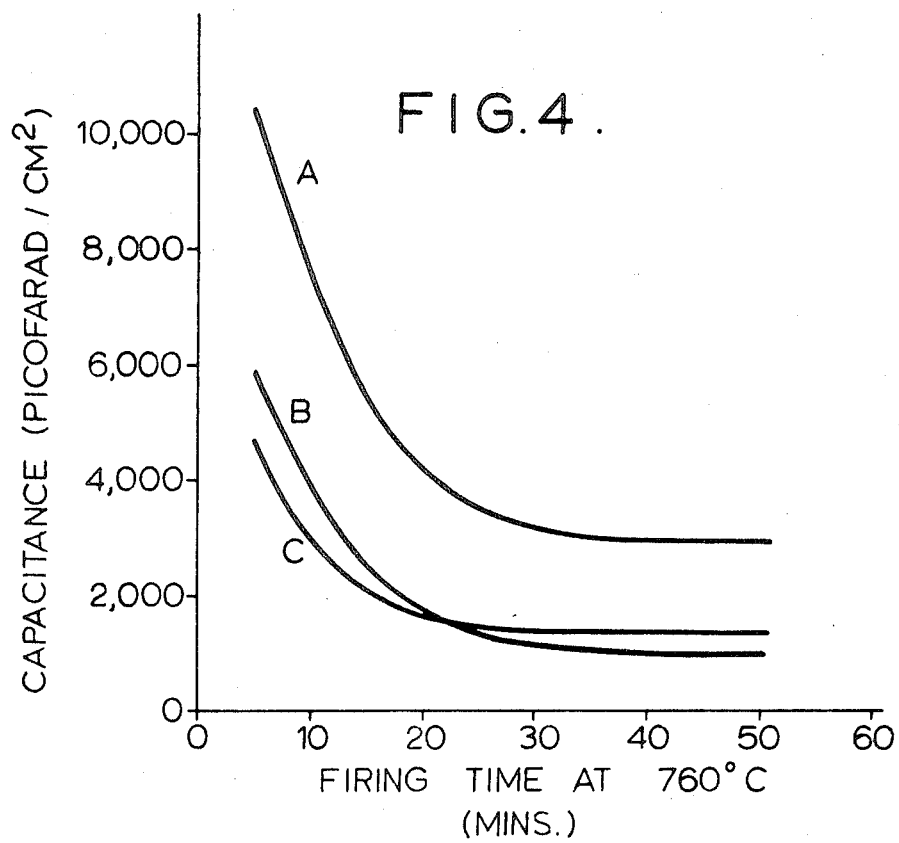
Figure 5:
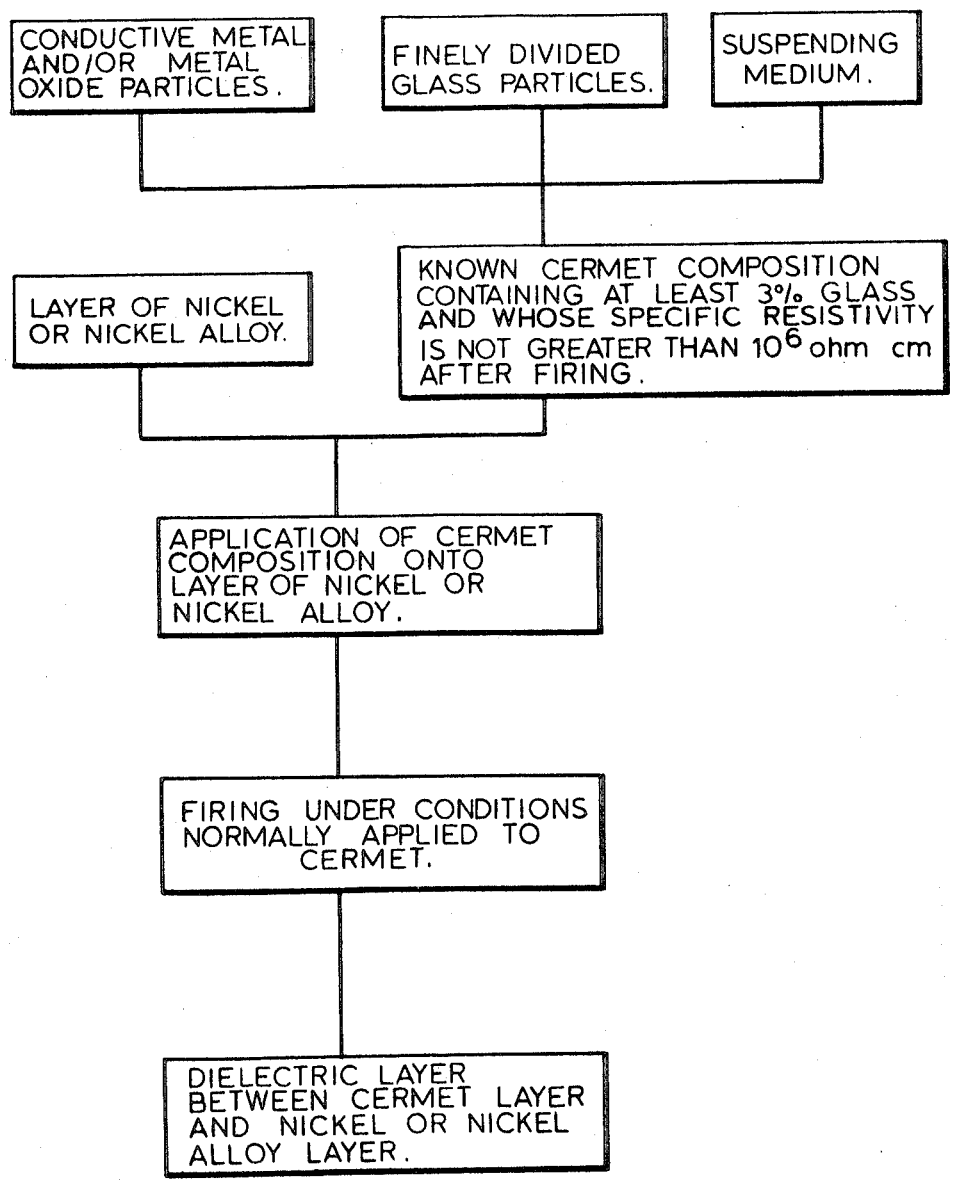

The present invention will be described in greater detail by reference to the accompanying diagrammatic drawings, in which FIG. 1 is a cross-sectional view of one embodiment of a capacitor constructed in accordance with the present invention, FIG. 2 is a cross-sectional view of another embodiment of the capacitor of the present invention, FIG. 3 represents a plan view of a substrate having capacitors formed thereon in accordance with the process of the present invention, FIG. 4 is a graph showing curves indicating the variation of the capacitance with firing times of various capacitors constructed in accordance with the process of the present invention, and FIG. 5 is a flow chart illustrating the steps involved in the process of the invention.

Referring first to FIG. 1 of the drawings a substrate 1, consisting, for example, of a sheet of an alumina ceramic material has a film 2 of nickel alloy, preferably of nickel-boron, deposited thereon. Electroless plating techniques, well-known in the art, provide one convenient method of depositing such films. Instead of the substrate of ceramic with the nickel alloy film a single sheet of nickel or a nickel alloy may be provided. A layer of a cermet 4 (this has a composition such that it becomes electrically conductive on firing) is applied to the metallic film 2 by well-known techniques such as screen-printing; the cermet 4 is then fired in manner described hereinafter and chemical interaction with the metal or alloy occurs to form a dielectric layer 3. The cermet layer 4, after firing, is essentially conductive, but if its resistivity is towards the upper end of the range specified above, it is preferable to apply a film of a good electrical conductor to enable satisfactory terminations to be obtained. In order to provide good electrical connection to the cermet 4, a film 5 of a metal (e.g. aluminum, chromium, nickel, copper, gold or silver) is deposited thereon by well-known techniques such as, for example, vacuum evaporation. Alternatively a cermet having a high conductivity, e.g. Du Pont 8151 palladium-silver paste, may be applied by techniques such as screen-printing and then fired on to layer 4.

An alternative form of construction, which makes use of the novel reaction for forming dielectric layers, is illustrated in FIG. 2 of the drawing. If the nickel alloy film is thin, e.g. nickel-boron alloy of less than 3,000 angstrom units, so that it all reacts with the cermet, two conducting regions 2 and 4 separated by a narrow dielectric layer 3 are obtained. Such narrow layers are useful in the formation of capacitors of the interdigitated electrode type, there being appreciable capacitance between the conducting layers 2 and 4. As described with reference to FIG. 1, a metallic film 5 deposited on the surface of the cermet 4 ensures that good electrical connections are achieved.

Using electroless plating techniques, it is more convenient to produce thick films of nickel or nickel-phosphorus alloy than to deposit thick films of nickel-boron alloy because nickel-boron plating solutions tend to be less stable than the others. With nickel-boron solutions it is only possible to maintain relatively low concentrations of boron, in the form of borohydride, in solution with the result that it is difficult to deposit a nickel-boron layer of 80,000 angstrom units thickness since frequent additions of small quantities of borohydride have to be made to the nickel-boron plating solution to avoid exhaustion when long plating times are being used. However, very good results may be obtained with nickel-boron alloy but for this purpose it is not necessary that the whole layer (i) should be of nickel-boron alloy; providing the layer (i) is constituted by a nickel-boron alloy portion of thickness 3,000 angstrom units or more, the remainder of said layer may be of nickel or nickel-phosphorus alloy. Such a composite layer (i) may be produced by depositing on a nickel or nickel-phosphorus alloy layer a nickel-boron alloy to a thickness of at least 3,000 angstrom units, the total thickness being at least 80,000 angstrom units.

When the metallic layer of the capacitor of the invention is a nickel-phosphorus or nickel-boron alloy, a suitable upper limit for the phosphorus and boron is 13 percent by weight and 8 percent by weight respectively, based on the alloy.

FIG. 5 comprises a flow chart illustrating the process steps of the invention. As indicated, the layer 2 of nickel or nickel alloy is provided with a layer of a cermet characterized by the properties already discussed. Firing is then carried out at a temperature recommended for the cermet employed whereby the dielectric reaction product will be formed as the layer 3. A metal film may optionally be added to provide for electrical connection.

The following Examples are given to illustrate the invention. Reference is made to FIG. 3 of the drawings which represents a plan view of a substrate having capacitors produced thereon. In the Examples the capacitance was measured at a frequency of 1KHz.

Example 1

Rosenthal 615X substrates 6 measuring approximately 4.5 × 1.6 centimeters were cleaned by immersing them in acetone, then in an ultrasonic bath containing a 10 percent solution of Decon 75 marketed by Medical-Pharmaceutical Developments Limited of Ellen Street, Portslade by Sea, Sussex, and finally rinsed in distilled water. The substrates 6 were then immersed for 90 seconds in a beaker containing a sufficient amount of an aqueous solution of 1 percent weight/volume stannous chloride and 1 percent volume/volume hydrochloric acid to just cover them. The excess solution was poured off the substrates and they were thoroughly rinsed in distilled water. They were then covered for 30 seconds with an aqueous solution containing 0.1 percent weight/volume of palladium chloride and 0.25 percent volume/volume of hydrochloric acid. The excess solution was poured off and the substrates were rinsed in distilled water having a pH value between 6 and 8.

An aqueous electroless plating solution was prepared having the following composition:

| | |
|---|---|
| Nickel chloride (hydrated) | 28g/l, |
| sodium hypophosphite | 17g/l, |
| ammonium chloride | 80g/l and |
| sodium citrate | 50g/l. |

To five parts by volume of this solution was added one part by volume of an aqueous 20 percent solution of sodium hydroxide.

The activated substrates were immersed in the metallizing solution at 80°C for 30 minutes during which period of time nickel-phosphorus films having a sheet resistivity of approximately 0.08 ohm per square were deposited. The metallized substrates were then rinsed in distilled water and acetone. Some of these metallized substrates were then immersed in an aqueous solution containing,

| | |
|---|---|
| Nickel chloride (hydrated) | 20 g, |
| ethylenediamine | 50 ml, |
| sodium hydroxide | 40 g, |
| sodium borohydride | 0.67 g |
| distilled water | 1 liter | for 30 minutes at 80°C, during which period a nickel-boron layer of at least 3,000 angstrom units in thickness was deposited on the nickel-phosphorus film. The metallized substrates were then rinsed in distilled water and acetone. Regions 8, 9, 10 of the substrates, some metallized with nickel-phosphorus and others metallized with nickel-phosphorus overplated with nickel-boron, were coated with an acid-resistant ink (e.g. KP1093, marketed by Coates Brothers Limited of Easton Street, Rosebery Avenue, London, W.C.1), by known screen-printing techniques and dried at 150°C for 30 minutes. The uncoated, i.e. unprotected, regions of nickel alloy were then etched away using nitric acid and the substrates were rinsed in distilled water and allowed to dry. The protective ink was then removed with trichloroethylene. Metallized regions 8, 9 and 10 thus remained on the substrates. A film of a paste comprising a mixture of 90 parts by weight of Du Pont 7822 and 120 parts by weight of Du Pont 7823, about 0.002 centimeters thick, was screen-printed on to an area of the substrates shown as 7 in FIG. 3 of the drawings. After drying at 120°C for 15 minutes, the substrates were placed in a furnace at 760°C and samples were removed at intervals up to a maximum of 1 hour. After cooling, the substrates were masked so that only the area 7 was exposed. A film of aluminum was vacuum evaporated on to the cermet 7 using well-known techniques.

The capacitors so prepared were allowed to stand in air at room temperature for about 3 days before measurements were made.

As illustrated in FIG. 3, three capacitors have been provided on each substrate 6, the electrode 7 being common to all three capacitors, the unreacted portions of 8, 9, 10 providing a second electrode for each capacitor respectively.

The capacitors so prepared each had an area of 0.064 square centimeters.

The variation in capacitance with firing time at 760°C is shown in FIG. 4 of the drawings. Curve A shows this variation for the cermet fired on to nickel-phosphorus and curve B shows the variation for the cermet fired on to nickel-boron.

For capacitors prepared by interaction of the cermet with nickel-boron, typical values obtained for the loss tangent were: 0.004 at a capacitance value of 1500 picofarads per square centimeter and 0.020 at a capacitance value of 5,500 picofarads per square centimeter. These capacitors exhibited a temperature coefficient of capacitance of less than 150 parts per million/°C and a typical breakdown voltage of 100 to 200 volts. Insulation resistance, measured at room temperature with 1 volt D.C. applied, was typically $1.6 \times 10^{10}$ ohm.

Example 2

A sheet of nickel, 0.015 centimeter thick and of purity not less than 99 percent, was degreased by immersion in trichloroethylene. A film of Du Pont paste used in Example 1 was applied over an area of nickel of about 0.1 square centimeter and fired as described in Example 1. A film of aluminum was vacuum evaporated on to the cermet as in Example 1. After allowing to stand for about 3 days at room temperature, capacitance values were measured and the variation of capacitance with firing time at 760°C is shown by curve C in FIG. 4 of the drawings. The capacitors produced had an area of about 0.01 square centimeters and those of this area with capacitance of 2,000 picofarad per square centimeter had an insulation resistance value (measured at room temperature at 1 volt D.C.) of about $3.0 \times 10^8$ ohm and a value for the loss tangent of typically 0.020.

Example 3

Substrates 6 were provided with regions 8, 9 and 10 of nickel-phosphorus alloy coated with nickel-boron alloy, as described in Example 1. A film of Alloys Unlimited Incorporated gold conductor composition C5004, about 0.002 centimeters thick, was screen printed on to an area 7. After drying at 120°C for 15 minutes, the substrates were placed in a furnace at 700°C for 15 minutes and then allowed to cool. Three capacitors, each of 0.064 square centimeters area, were thus produced on each substrate. The capacitors had a capacitance value of about 4,750 picofarad per square centimeter and a value for the loss tangent of about 0.005; the insulation resistance, measured at room temperature (1 volt D.C. applied) was typically $6.0 \times 10^{10}$ ohm.

Example 4

Capacitors were prepared as described for Example 3 except that a film of a paste comprising 40 percent by weight of Du Pont 7713 silver conductor composition and 60 percent by weight of powdered (about 5 micron particle diameter) X76 glass (the glass being manufactured by Glass Tubes and Components Ltd.) was applied to the nickel-boron alloy and firing was carried out at 700°C for 30 minutes.

The capacitors so produced had a capacitance value of about 1900 picofarad per square centimeter and the loss tangent was about 0.004; the insulation resistance, measured at room temperature (1 volt D.C. applied), was typically $1.8 \times 10^{11}$ ohm.

Although the present invention is described herein with particular reference to specific details, it is not intended that such details shall be regarded as limitations upon the scope of the invention except insofar as included in the accompanying claims.

The L92 glass referred to above has the following composition:

| | |
|---|---|
| $SiO_2$ | 56.0 % by weight |
| $Al_2O_3$ | 1.4 % by weight |
| PbO | 30.0 % by weight |
| $Na_2O$ | 4.6 % by weight |
| $K_2O$ | 8.0 % by weight |

Example 5

Capacitors were prepared as described for Example 3 except that a film of a paste comprising 52 percent by weight of Du Pont 8151 palladium-silver conductor composition and 48 percent by weight of powdered (about 5 micron particle diameter) X76 glass (manufactured by Glass Tubes and Components Limited) was applied to the nickel-boron alloy and firing was carried out at 700°C for 30 minutes.

The capacitors so produced had a capacitance value of about 1580 picofarad per square centimeter and the loss tangent was about 0.007; the insulation resistance, measured at room temperature (1 volt D.C. applied), was typically $5 \times 10^{10}$ ohm.

The composition of X76 glass used in the above Examples is as follows:

| | |
|---|---|
| $B_2O_3$ | 17.0 % by weight |
| PbO | 64.0 % by weight |
| ZnO | 14.0 % by weight |
| $SiO_2$ | 5.0 % by weight. |

I claim:

1. A construction characterized by dielectric properties consisting of a first layer formed of metal selected from the group consisting of nickel and alloys of nickel, a second layer consisting of a cermet, said cermet having a glass content of at least three percent by weight but not greater than the amount necessary for developing specific resistivity in the cermet in excess of $10^6$ ohm cm, said cermet becoming electrically conductive upon firing, and including a third layer located intermediate said first and second layers, said third layer comprising the reaction product resulting from the firing of a composite of said first and second layers.

2. A dielectric construction according to claim 1, in which said first layer is an alloy selected from the class consisting of nickel-boron alloys, nickel-phosphorus alloys and nickel-phosphorus-coablt alloys.

3. A dielectric construction according to claim 1, in which the cermet layer contains at least 10 percent by weight of glass.

4. A dielectric construction according to claim 1, in which the cermet used is one having a constitution such that, after firing, it has a sheet resistivity of from 0.01 ohm to $10^6$ ohm per square.

5. A construction in accordance with claim 1 wherein terminals are applied to said first and second layers whereby the construction is useful as a capacitor.

6. A capacitor according to claim 5, in which said first layer is an alloy selected from the class consisting of nickel-boron alloys, nickel-phosphorus alloys and nickel-phosphorus-cobalt alloys.

7. A capacitor according to claim 5, in which the cermet layer contains at least 10 percent by weight of glass.

8. A capacitor according to claim 5, in which the cermet used is one which, after firing, will have a sheet resistivity of from 0.01 ohm to $10^6$ ohm per square.

9. A process for producing a construction characterized by dielectric properties comprising the steps of providing a first layer formed of a metal selected from the group consisting of nickel and alloys of nickel, applying a second layer to said first layer to form a composite, said second layer comprising a cermet capable of becoming electrically conductive upon firing and having a glass component having a melting point below the melting point of said first layer, said glass being contained in said second layer in an amount of at least three percent by weight but not exceeding the amount necessary for providing a specific resistivity of the cermet in excess of $10^6$ ohm cm, and firing said composite at a temperature sufficient to produce a third layer of a dielectric comprising the reaction product developed at the interface of said first and second layers during such firing.

* * * * *